United States Patent
Ohkawa

(10) Patent No.: US 8,605,345 B2
(45) Date of Patent: Dec. 10, 2013

(54) IMAGE PROCESSING APPARATUS, IMAGE PROCESSING METHOD AND COMPUTER PROGRAM PRODUCT

(75) Inventor: Satoshi Ohkawa, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 342 days.

(21) Appl. No.: 13/064,049

(22) Filed: Mar. 3, 2011

(65) Prior Publication Data

US 2011/0228361 A1    Sep. 22, 2011

(30) Foreign Application Priority Data

Mar. 16, 2010    (JP) .................................. 2010-059712

(51) Int. Cl.
  *H04N 1/04*    (2006.01)
(52) U.S. Cl.
  USPC ........... 358/505; 358/474; 358/475; 358/1.15
(58) Field of Classification Search
  USPC .................. 358/505, 474, 475, 1.15
  See application file for complete search history.

(56) References Cited

U.S. PATENT DOCUMENTS

| | | | |
|---|---|---|---|
| 5,313,312 A | 5/1994 | Yamada | |
| 6,788,441 B1 | 9/2004 | Ohkawa | |
| 7,057,771 B2 | 6/2006 | Ohkawa | |
| 7,069,460 B2 | 6/2006 | Ohkawa | |
| 7,376,268 B2 | 5/2008 | Shirata et al. | |
| 7,551,796 B2 | 6/2009 | Ohyama et al. | |
| 7,664,320 B2 | 2/2010 | Yoshida et al. | |
| 7,672,004 B2 | 3/2010 | Ohyama et al. | |
| 7,692,816 B2 | 4/2010 | Kawamoto et al. | |
| 7,710,599 B2 | 5/2010 | Miyamoto et al. | |
| 7,724,986 B2 | 5/2010 | Murataka et al. | |
| 2004/0114172 A1 | 6/2004 | Ohyama et al. | |
| 2004/0131263 A1 | 7/2004 | Kawamoto et al. | |
| 2004/0156076 A1 | 8/2004 | Togami et al. | |
| 2004/0263884 A1 | 12/2004 | Arai et al. | |
| 2004/0263890 A1 | 12/2004 | Kawamoto et al. | |
| 2005/0024666 A1 | 2/2005 | Ohyama et al. | |
| 2005/0024677 A1* | 2/2005 | Miura et al. ................. | 358/1.15 |
| 2005/0046881 A1 | 3/2005 | Tone et al. | |
| 2005/0088696 A1 | 4/2005 | Kagawa et al. | |
| 2005/0213120 A1 | 9/2005 | Ohkawa et al. | |
| 2005/0219594 A1 | 10/2005 | Miyamoto et al. | |
| 2005/0280857 A1 | 12/2005 | Sugiyama et al. | |
| 2006/0008139 A1 | 1/2006 | Hirota et al. | |

(Continued)

FOREIGN PATENT DOCUMENTS

| | | |
|---|---|---|
| EP | 2114064 | 11/2009 |
| JP | 3015045 | 12/1999 |

(Continued)

OTHER PUBLICATIONS

European Serach Report dated Aug. 27, 2012 issued in European Application No. 11158167.4.

*Primary Examiner* — Houshang Safaipour

(74) *Attorney, Agent, or Firm* — Harness, Dickey & Pierce, P.L.C.

(57) ABSTRACT

A color determination unit divides an original image input from an image scanning unit into blocks, and determines whether or not each block is a color image area. The color determination unit determines whether the original is in color or monochrome in each of a plurality of set areas on the basis of the result of determination on the blocks included in that area.

11 Claims, 10 Drawing Sheets

(56) References Cited

U.S. PATENT DOCUMENTS

| | | |
|---|---|---|
| 2006/0089133 A1 | 4/2006 | Yoshizawa et al. |
| 2006/0215205 A1 | 9/2006 | Ohyama et al. |
| 2007/0053009 A1 | 3/2007 | Ito et al. |
| 2007/0058224 A1 | 3/2007 | Kawamoto et al. |
| 2007/0064267 A1 | 3/2007 | Murakata et al. |
| 2007/0070405 A1 | 3/2007 | Murakata et al. |
| 2007/0086068 A1 | 4/2007 | Ohkawa et al. |
| 2007/0226692 A1 | 9/2007 | Nozawa et al. |
| 2008/0008388 A1 | 1/2008 | Ohkawa et al. |
| 2008/0037036 A1 | 2/2008 | Togami et al. |
| 2008/0043291 A1 | 2/2008 | Togami et al. |
| 2008/0068671 A1 | 3/2008 | Yoshida et al. |
| 2008/0117468 A1 | 5/2008 | Ohkawa |
| 2008/0231894 A1 | 9/2008 | Ohkawa |
| 2008/0239354 A1 | 10/2008 | Usui |
| 2009/0123078 A1 | 5/2009 | Ohkawa |
| 2009/0273814 A1 | 11/2009 | Ohkawa |
| 2010/0046831 A1* | 2/2010 | Kang .......................... 382/166 |
| 2010/0165375 A1 | 7/2010 | Miyamoto et al. |

FOREIGN PATENT DOCUMENTS

| | | |
|---|---|---|
| JP | 2001119589 A | 4/2001 |
| JP | 2002369012 A | 12/2002 |
| JP | 3713352 | 8/2005 |
| JP | 2007251835 A | 9/2007 |
| JP | 4476203 | 3/2010 |

\* cited by examiner

IMAGE PROCESSING APPARATUS, IMAGE PROCESSING METHOD AND COMPUTER PROGRAM PRODUCT

CROSS-REFERENCE TO RELATED APPLICATIONS

The present application claims priority to and incorporates by reference the entire contents of Japanese Patent Application No. 2010-059712 filed in Japan on Mar. 16, 2010.

BACKGROUND OF THE INVENTION

1. Field of the Invention

The present invention relates to an image processing apparatus which stores an image of an original and outputs an entire area or partial area of the stored image of the original as a color image or a monochrome image.

2. Description of the Related Art

With the development of line sensor scanning devices using a CCD unit and writing devices using laser, there have been released digital copying machines which process digitalized image data. Aside from the copy function, digital copying machines implement a lot of functions such as a scanner function, printer function, and facsimile function, and are now called digital MFPs. MFPs have easy network access, and can transmit the image data stored in a hard disk drive (HDD) or the like inside the apparatus to external devices over a network. MFPs can also receive and store image data from external devices through the network.

MFPs have a variety of uses in offices, and MFPs themselves have been diversified from small to large sizes accordingly. Examples include a small-sized MFP to be paired and installed with a PC so that the operator can easily use the functions of the copying machine, facsimile, printer, and scanner. A medium-sized MFP can be shared among a plurality of members in a department or section, with some productivity and functions such as sorting, punching, and stapling. A department that undertakes a company's copy-related activities in a centralized way, or a company that runs copy-related business itself, uses large-sized MFPs with high productivity, high quality, and high functionalities.

Such a variety of MFPs from small to large sizes have functions common to all classes and functions unique to the respective classes. For example, there is a high need for large-sized MFPs to have functions for postprocessing on plotted paper, such as punching, stapling, and folding, as well as functions for electronic filing concurrent with copying operations. In contrast, what is demanded of small-sized MFPs is the Internet FAX and PC-FAX capabilities, and functions such as high quality image printing on dedicated paper for personal use.

In such a diversified MFP market, it has heretofore been the case that systems having a set of functions needed for respective classes are constructed, sold, and provided. The importance of information values in business has already been recognized, and what is demanded of information communication is not just speed, accuracy, and reliability, but higher understandability and effectiveness as well. With communication technologies getting faster and more prevalent, memories larger in capacity, lower in cost, and smaller in size, and PCs higher in sophistication, there have been provided new functions for effective handling of information using digital data. The provision and implementation of the new functions has also been desired of MFPs which handle digital image data, a part of digital data.

As mentioned previously, MFP's "output" includes an output to paper like copying, and transmission of electronic data as with a scanner and FAX transmission. For electronic data transmission, the form of output varies depending on the intended use. For example, FAX uses a monochrome binary image data format. Scanners use RGB color image data or the like.

While the MFP can output image data through various output means, the individual output means have respective different output characteristics. For paper output, writing units have various characteristics. For scanner distribution, display units vary in characteristic and the like.

Now, one of the functions of the MFP is to identify whether the scanned document is in color or monochrome, make a monochrome output if the original is monochrome, and make a color output if the original is in color.

For example, whether the original is in color or monochrome is determined on the basis of image data that is obtained by pre-scanning the original. Subsequently, processing based on the result of determination whether the original is in color or monochrome is applied to image data that is obtained by fully scanning the original. Since the method includes scanning the original twice, the document scanning speed becomes substantially ½ or less, which has caused an adverse effect on the number of copies output per minute. In addition, there has been the inconvenience that if the original consists of a plurality of pages, a discrepancy can occur between the results of determination whether the original pages are in color or monochrome and the number of scanned pages when the document feeding unit comes to a halt due to paper jamming and the like.

Color image data and monochrome image data may be generated without a pre-scan, in parallel with scanning the original once (see, for example, Japanese Patent Application Laid-open No. 2002-369012). To make a copy, a CMYK image is generated for output printing use. If the result of determination is monochrome, only the K signal is used to make a paper output, in which case the output image quality is lower than that of an image that is generated exclusively for monochrome output. If the CMYK image is generated in consideration of such K signal-based monochrome image output, then the image output as a color document has image quality lower than that of an image that is generated exclusively for color output. According to such a method, when transmitting the image data to a PC or the like, the color image is rendered into an RGB image and the monochrome image into a K image. There is thus a need to generate a color image and a monochrome image simultaneously if the color and monochrome output formats have nothing in common.

Recent MFPs are multi-input multi-output. Examples of the inputs include a scanner image, an image transferred over a network, and a digital camera image read from a PC card or the like. Examples of the outputs include paper printing, FAX transmission, and transmission of image data to a PC.

To make the foregoing multi-output of a single scanned image, some MFPs are configured to store the scanned image inside and make a determination whether the document is in color or monochrome at the time of scanning (as for a similar apparatus, see Japanese Patent Application Laid-open No. 2007-088783). When outputting the stored image, the MFP applies processing corresponding to the result of color/monochrome document determination made at the time of document scanning to the image. Using the result of color/monochrome document determination obtained at the time of image scanning, however, it is not possible to expect an appropriate image output when the intended use of the image at the time of image storing differs from that of reuse time. An example is when an output area of the image different from assumed at the time of image storing is employed for the output.

Japanese Patent Application Laid-open No. 2001-119589 discloses an image processing apparatus which inputs image data of an original by a single document scan, and simultaneously makes a determination whether the original is in color or monochrome (auto color select: ACS) on the basis of the image data. The apparatus retains the result of determination and the image data, and outputs the retained image data on the basis of the result of color/monochrome determination on the original retained. It is mentioned in the same patent document that the ACS area can be set independent of the size, position, and other factors of the original. It should be noted that the result of color/monochrome determination on the original, retained with the image is concerned only with the ACS area that is set at the scanning time. If the output image size is changed from the scanned image size, there is no guarantee that the result of determination stored can be simply used to produce an appropriate image output since the result of determination is not derived from an ACS area that is suited to the changed image size.

Japanese Patent No. 3015045 discloses a color copying apparatus in conjunction with an example of "continuous page copy" where two facing pages of a book are copied in page order. The color copying apparatus makes a color/monochrome determination on each of a plurality of areas to be copied, stores the results of determination, performs color copy processing on images in each area to be copied if the corresponding result of determination is "color," and performs monochrome copy processing if the corresponding result of determination is "monochrome." It is also mentioned in the same patent document that the apparatus is similarly applicable to a "continuous enlarged copy" where a single sheet of original is divided into a plurality of areas, and each of the areas is enlarged and copied so that the copy outputs are put together to produce a super enlargement copy. As a concrete method for color/monochrome determination, Japanese Patent No. 3015045 discloses the following example. The color copying apparatus performs the operation of scanning the original for each of the areas to be copied while making a chromatic/achromatic determination on the image signal pixel by pixel to count pixels that are determined to be chromatic. Having performed the operation on all the areas to be copied, the apparatus then performs the operation of determining whether each area to be copied is "color" or "monochrome": that is, "color" if the proportion of the number of pixels determined to be chromatic in that area with respect to the total number of pixels, or the number of pixels determined to be chromatic itself, exceeds a predetermined value, and "monochrome" if not. With a large number of areas to be copied, however, such a method is inefficient since the operation of scanning the original for each of the areas to be copied is repeated many times. In particular, when a plurality of areas to be copied overlap each other, the overlapping portions of the areas to be copied are inefficiently scanned for color/monochrome determination repeatedly. Moreover, there is a need that counters for counting the numbers of chromatic pixels in respective areas and retaining the count values until the final determination be prepared on a RAM or the like. The greater the number of areas to be copied is, the greater the memory area needs to be prepared on the RAM or the like for the sake of the area-specific counters. This contributes to an increase in circuit scale and cost (with regard to the problem related with the memory capacity, also see Japanese Patent Application Laid-open No. 2007-251835).

In view of the foregoing, a main object of the present invention is to improve the reusability of an image stored in an image processing apparatus such as an MFP which stores the image of an original and outputs an entire area or partial area of the stored image as a color image or a monochrome image. To achieve the main object, it is an object of the present invention to set various areas that overlap each other so that whether the original is in color or monochrome can be determined in each of the areas. Another object of the present invention is to allow highly accurate color determination, to allow area-by-area color determination with a small amount of processing even if the set areas increase in number and intricately overlap each other, and to reduce the memory necessary for color determination. Yet another object of the present invention is to automatically set areas appropriate for color determination on the basis of history information pertaining to user's image output and information on output sheets loaded in the apparatus.

SUMMARY OF THE INVENTION

It is an object of the present invention to at least partially solve the problems in the conventional technology.

According to one aspect of the present invention, an image processing apparatus for storing an image of an original and outputting an entire area or partial area of the stored image of the original as a color image or a monochrome image, the apparatus includes: an area setting unit for setting a plurality of areas; a color determination unit for determining whether the original is in color or monochrome in each of the areas set by the area setting unit on the basis of the image of the original; and a unit for storing a result of determination made by the color determination unit on the image of the original as accessory information on the image of the original, wherein the color determination unit includes a block color determination processing unit for dividing the image of the original into a plurality of first blocks and determining whether or not each of the first blocks is a color image area, and an area color determination processing unit for determining whether the original is in color or monochrome in each of the areas set by the area setting unit on the basis of a result of determination made by the block color determination processing unit on the first blocks included in the area.

According to another aspect of the present invention, an image processing method for storing an image of an original and outputting an entire area or partial area of the stored image of the original as a color image or a monochrome image, the method includes: setting a plurality of areas; determining whether the original is in color or monochrome in each of the areas set in the setting on the basis of the image of the original; and storing a result of determination made in the determining on the image of the original as accessory information on the image of the original, wherein the determining including dividing the image of the original into a plurality of first blocks and determining whether or not each of the first blocks is a color image area, and determining whether the original is in color or monochrome in each of the areas set in the setting on the basis of a result of the determination made on the first blocks included in the area.

According to still another aspect of the present invention, a computer program product includes a non-transitory computer-usable medium having computer-readable program codes embodied in the medium for storing an image of an original and outputting an entire area or partial area of the stored image of the original as a color image or a monochrome image in an image processing apparatus, the program codes when executed causing a computer to execute: setting a plurality of areas; determining whether the original is in color or monochrome in each of the areas set in the setting on the basis of the image of the original; and storing a result of determination made in the determining on the image of the original as accessory information on the image of the original, wherein the determining includes dividing the image of the original into a plurality of first blocks and determining whether or not each of the first blocks is a color image area, and determining whether the original is in color or monochrome in each of the areas set in the setting on the basis of a result of determination made on the first blocks included in the area.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENT

Figure 1:
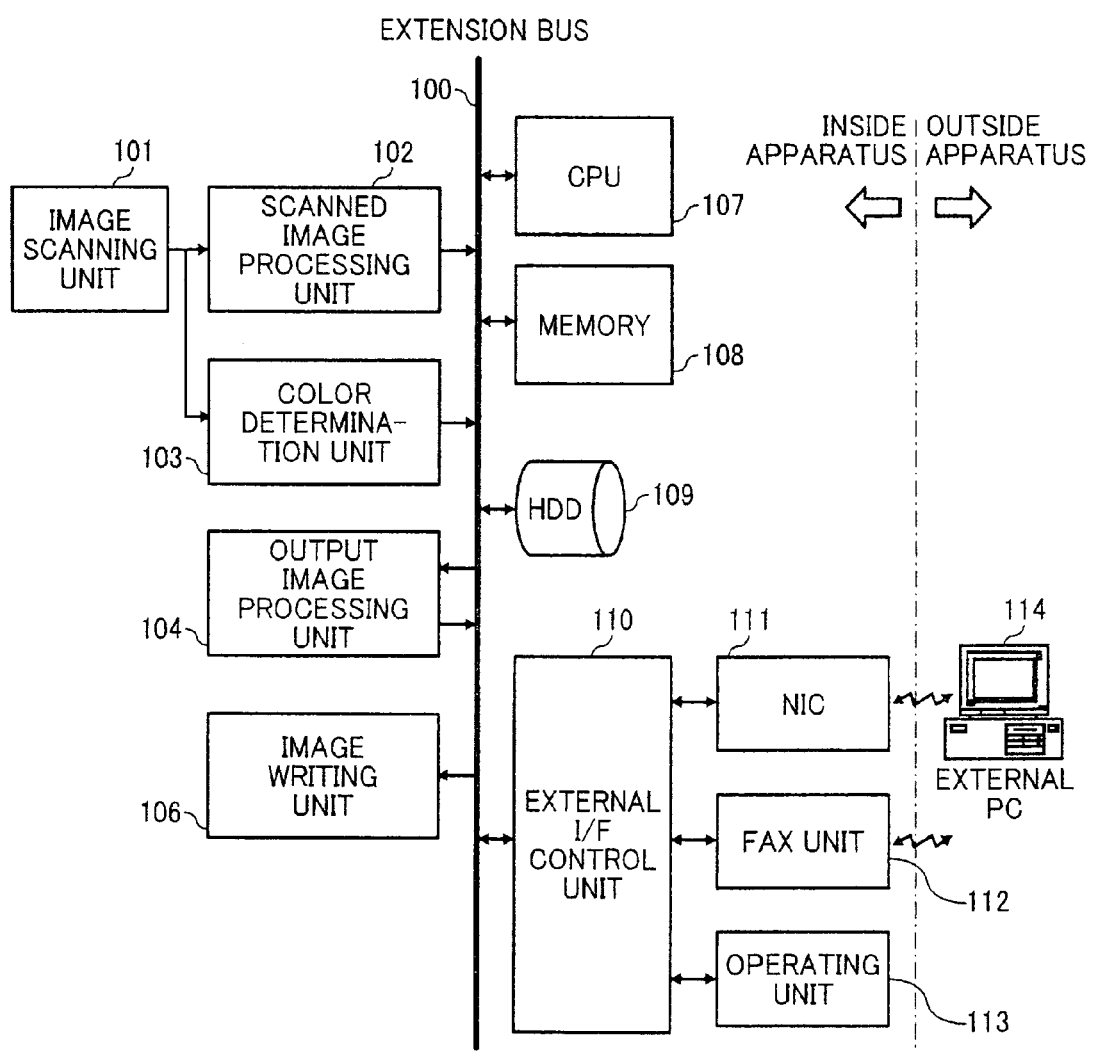
FIG. 1 is a block diagram showing an image processing apparatus according to an embodiment of the present invention.

FIG. 1 is a block diagram showing an image processing apparatus according to an embodiment of the present invention. The image processing apparatus shown here is a digital copying machine so-called MFP.

Figure 2:
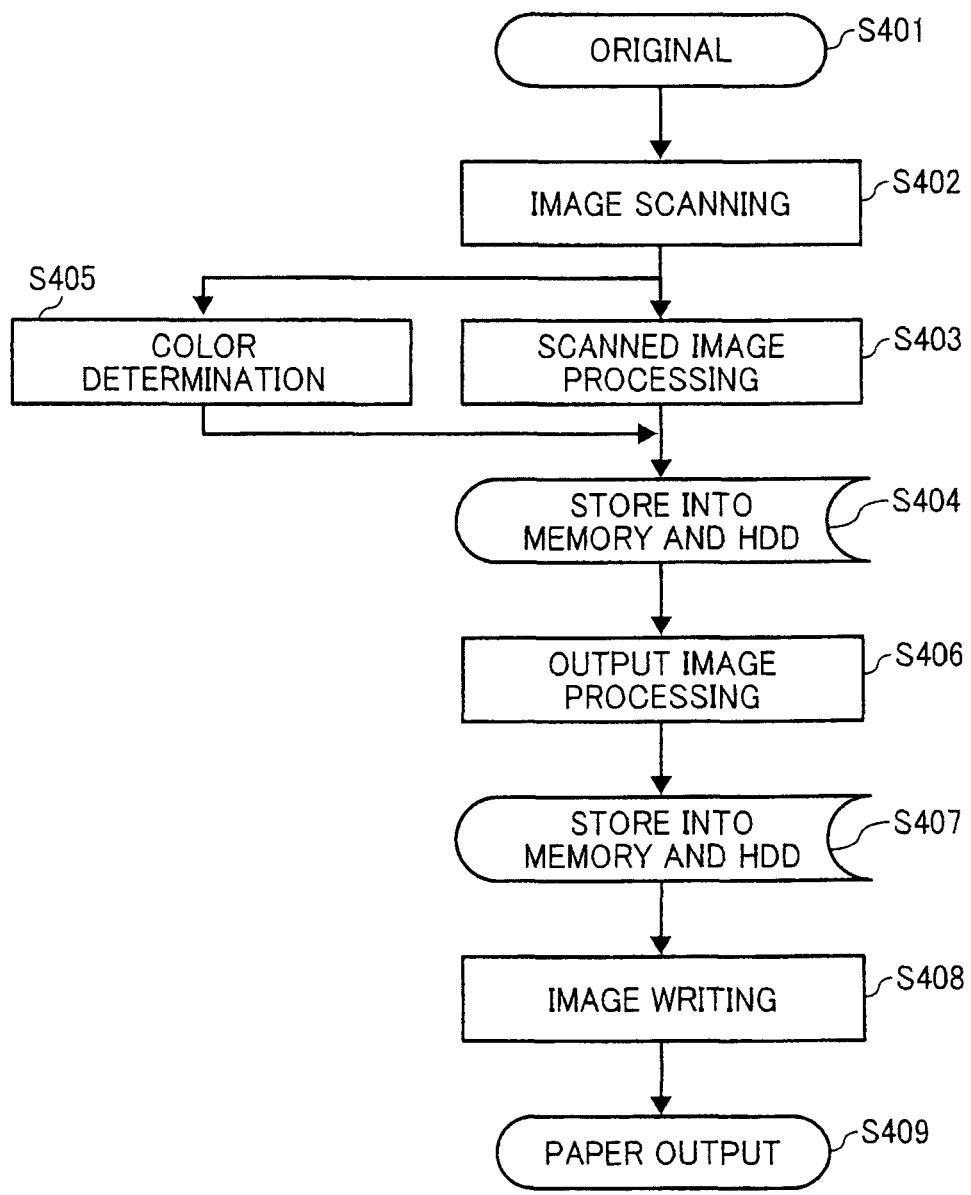
FIG. 2 is a schematic processing flowchart from the scanning of an original to paper output of the scanned image.

Initially, the general configuration of the digital copying machine and the outline of a processing flow from the scanning of an original to print output (see FIG. 2) will be described.

An image scanning unit 101 includes a line sensor made of CCD photoelectric transducers, A/D converters, and driver circuits thereof. The image scanning unit 101 scans a loaded original and inputs gradation information on the original as RGB digital image data of 8 bits each (step 402). The image scanning unit 101 also performs shading correction on the digital image data to correct unevenness resulting from sensitivity variations between the CCD elements. The image data input from the image scanning unit 101 is supplied to a scanned image processing unit 102 and a color determination unit 103. The scanned image processing unit 102 applies processing to the scanned image data (step 403). The color determination unit 103 performs processing to make a determination (color determination) whether the original is in color or monochrome in each of a plurality of areas (step 405). The configuration and processing of the scanned image processing unit 102 and the color determination unit 103 will be described later. Image data output from the scanned image processing unit 102 is stored into a memory 108 and a HDD (hard disk storing device) 109. In the meantime, the result of color determination made by the color determination unit 103 is stored, for example, as bibliographical information on the image data (step 404).

The image data and the result of color determination once stored in the memory 108 are transferred to an output image processing unit 104, and processed by the output image processing unit 104 (step 406). The configuration and processing of the output image processing unit 104 will be described later. Image data output from the output image processing unit 104 (color image data or monochrome image data on the entire area or a partial area of the stored image) is once stored into the memory 108 and the HDD 109 (step 407). The output image data stored in the memory 108 is transferred to an image writing unit 106, and paper output is made by electrophotography processes (step 408).

Aside from the foregoing components, the digital copying machine includes the following: a CPU 107 which controls the components of the apparatus; an external I/F control unit 110; a network interface card (NIC) 111 which is intended to communicate with an external PC 114 and the like over a network; a FAX unit 112 which performs fax communications; an operating unit 113 from which the user enters instructions and the like.; and an extension bus 100 to which the components 102, 103, 104, 106, 108, 109, and 110 are connected. Hereinafter, the configuration and processing of each of the components will be described.

Figure 3:
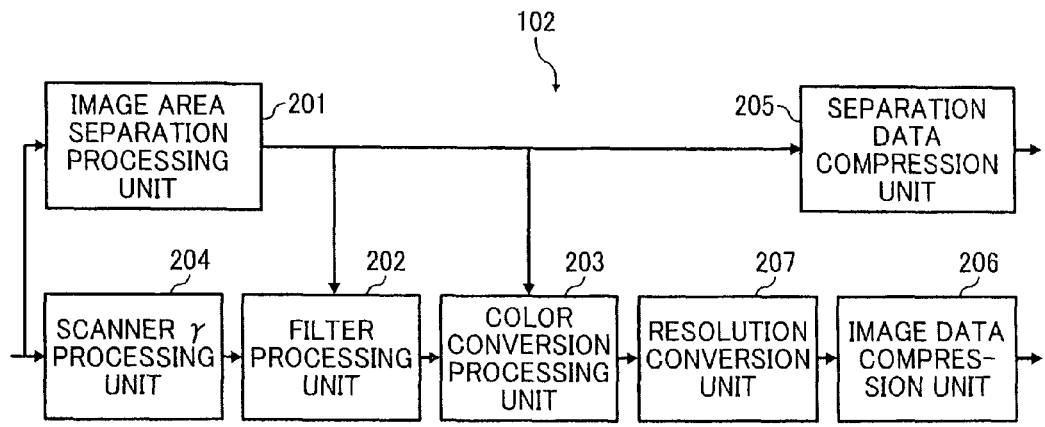
FIG. 3 is a block diagram showing an example of the internal configuration of a scanned image processing unit.

FIG. 3 is a block diagram showing an example of the internal configuration of the scanned image processing unit 102. In the scanned image processing unit 102, an image area separation processing unit 201 extracts characteristic areas of the original from the scanned image data. For example, the image area separation processing unit 201 performs the following processing pixel by pixel: extracting a dot area formed by ordinary printing; extracting an edge part of a character or the like; determining whether the image data is chromatic or achromatic; and making a white background determination whether the background image is white, and the like. As a result of extraction, pixel-by-pixel image area separation data is output.

The scanned image data is also input to a scanner γ processing unit 204, in which the scanned image data is subjected to γ conversion processing for the sake of conversion from the γ characteristics of the image scanning unit 101 into output space characteristics. Specifically, the scanner γ processing unit 204 performs γ conversion processing on the color signal (scanned image data) input from the image scanning unit 101 so that the achromatic characteristics match with the output space characteristics.

After the scanner γ conversion processing, the image data is input to a filter processing unit 202 for filter processing. This filter processing is intended to convert the spatial frequencies of the image data. The filter processing unit 202 applies characteristic filter processing to each of the extracted parts on the basis of the image area separation data from the image area separation processing unit 201. For example, an area that is detected as a dot area is subjected to smoothing processing for dot smoothing. A white background area of an edge part is subjected to edge enhancement processing for improved MTF characteristics, being estimated to be a text part.

The image data given such filter processing is input to a color conversion processing unit 203, in which the image data is subjected to color conversion processing to predetermined color space characteristics. Since the image data is once stored before output, the color space after the color conversion processing may be a general-purpose RGB space or a color space specific to the digital copying machine. Such color conversion may be performed by publicly known processing methods. For example, the color correction processing apparatus described in the publication of Japanese Patent No. 3713352 may be used.

The color-converted image data is transferred to a resolution conversion unit 207, in which the image data is subjected to resolution conversion from the input resolution into requested output resolution. Specifically, the resolution conversion unit 207 performs three-dimensional convolution processing. No resolution conversion is performed if the input resolution and the output resolution are the same.

The image data output from the resolution conversion unit 207 is compressed by an image data compression unit 206. In the meantime, the image area separation data output from the image area separation processing unit 201 is compressed by a separation data compression unit 205. The image data compression unit 206 may use an irreversible high-rate compression method such as JPEG. The separation data compression unit 205 needs to use a reversible compression method such as MMR. The reason is that the image area separation data is pixel-by-pixel information, and any degradation from compression precludes appropriate processing of the image area separation data in the output image processing unit 104. The compressed image data and the compressed image separation data processed by the scanned image processing unit 102 are transferred and stored into the memory 108 and the HDD 109 through the extension bus 100.

When the image scanning unit 101 is scanning an original, it is desirable that the image data continue to be transmitted to the image writing unit 106, like a plotter, with the same timing. In cases such as when the image writing unit 106 is getting ready for output, however, it is not possible to output the image data that is being input and the amount of image data written to the memory 108 may exceed the capacity of the memory 108. The overflow could be avoided by increasing the memory capacity of the memory 108 indiscriminately, which is unrealistic in terms of hardware cost. Thus, the image data is once stored into the HDD 109 of large capacity to solve the overflow of the memory 108. While the image data may be stored in the memory 108 for temporary storage purpose, it is preferred to store the image data into the HDD 109 if long-term storage is intended. The reason is that the memory 108 is typically composed of a volatile RAM or the like, and the image data stored in the memory 108 will be lost when the digital copying machine is powered off, for example.

Now, the image data once stored in the memory 108 is transferred to the output image processing unit 104 through the extension bus 100. The output image processing unit 104 converts the characteristics of the image data into image writing characteristics intended for paper output. For example, the output image processing unit 104 converts the image data into a CMYK image if the output to a color writing unit is intended.

Figure 4:
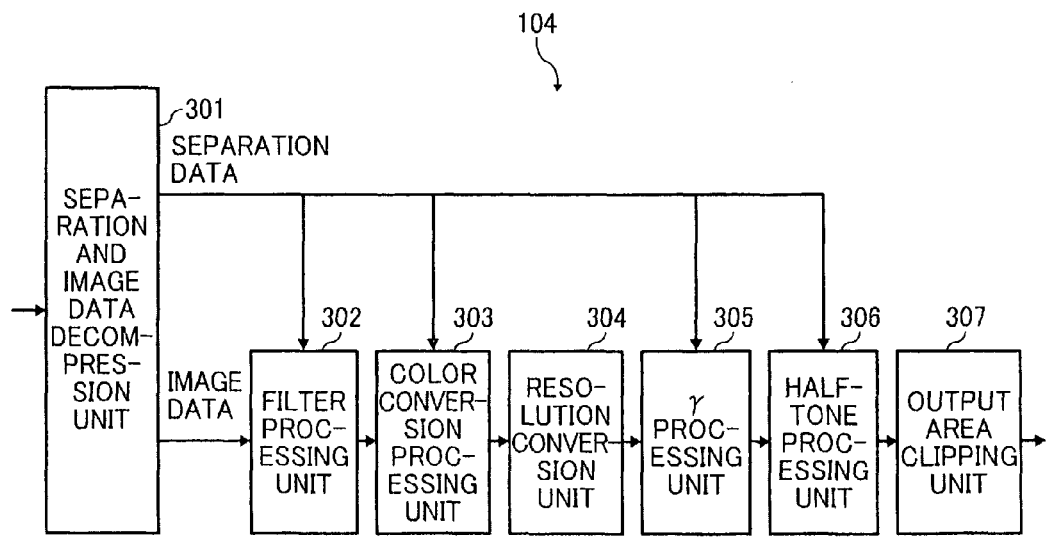
FIG. 4 is a block diagram showing an example of the internal configuration of an output image processing unit.

FIG. 4 is a block diagram showing an example of the internal configuration of the output image processing unit 104. In FIG. 4, the compressed image data and the compressed image area separation data are read from the memory 108 or the HDD 109, input into a separation and image data decompression unit 301 through the extension bus 100, decompressed into image data and image area separation data, and output in association with each other pixel by pixel. In a filter processing unit 302, the decompressed image data is subjected to filter processing and thereby adjusted to the MTF characteristics of the image writing unit 106. The aforementioned filter processing of the filter processing unit 202 in the scanned image processing unit 102 is intended to make a correction into predetermined characteristics for the purpose of storage in the memory 108, the HDD 109, and the like. In contrast, the filter processing unit 302 of the output image processing unit 104 performs conversion from the predetermined characteristics of the stored image into the image characteristics of the image writing unit 106. The filter processing unit 302 also performs characteristic conversion by using the characteristic image area separation data on the original.

After the filter processing of the filter processing unit 302, the image data is transferred to a color conversion processing unit 303. For example, using the image area separation data, the color conversion processing unit 303 can assume the presence of a black character if the image data is achromatic. On the basis of the assumption, the color conversion processing unit 303 can perform black monotone processing for CMYK conversion.

The image data processed by the color conversion processing unit 303 is subjected to scaling processing in a resolution conversion processing unit 304 if needed. In a γ processing unit 305, the image data is then subjected to γ conversion from the predetermined characteristics of the stored image into the output characteristics. In a halftone processing unit 306, the image data processed by the γ processing unit 305 is subjected to gradation processing, such as dithering and error diffusion processing, to the characteristics of the image writing unit 106. The halftone processing unit 306 also performs conversion into the gradation depth (number of bits) of the image writing unit 106. For example, for 1-bit output, the halftone processing unit 306 performs 1-bit rendering on the input 8-bit signal along with dithering.

Although no description has been given so far, the CPU 107 designates the output area of the original (one of set areas to be described later) and the result of color determination corresponding to the output area (stored as bibliographic information on the image data) for use in the output image processing unit 104. The output image processing unit 104 performs processing according to the result of color determination on the output area. For example, if the result of color determination is color, the color conversion processing unit 303 generates color image data which is composed of CMYK signals. If the result of color determination is monochrome, the color conversion processing unit 303 performs processing to generate monochrome image data which consists only of a K signal. Other processing units also perform processing using optimum parameters for monochrome image output. This makes it possible to output a high-quality monochrome image even if the original is scanned in color. An output area clipping unit 307 clips the image data on the designated output area of the original from the image data processed by the halftone processing unit 306 for output. The image data on the output area is the final output image data of the output image processing unit 104. Again, the image data is once stored into the memory 108, saved to the HDD 109 if needed, and then transferred to the image writing unit 106. The image writing unit 106 makes a paper output by electrophotography processes using a laser beam.

It will be understood that user specification or initial setting may be made so that color printing or monochrome printing is executed irrespective of the result of color determination. In such a case, the output image processing unit 104 performs the processing suited to the color printing or monochrome printing to execute.

Figure 5:
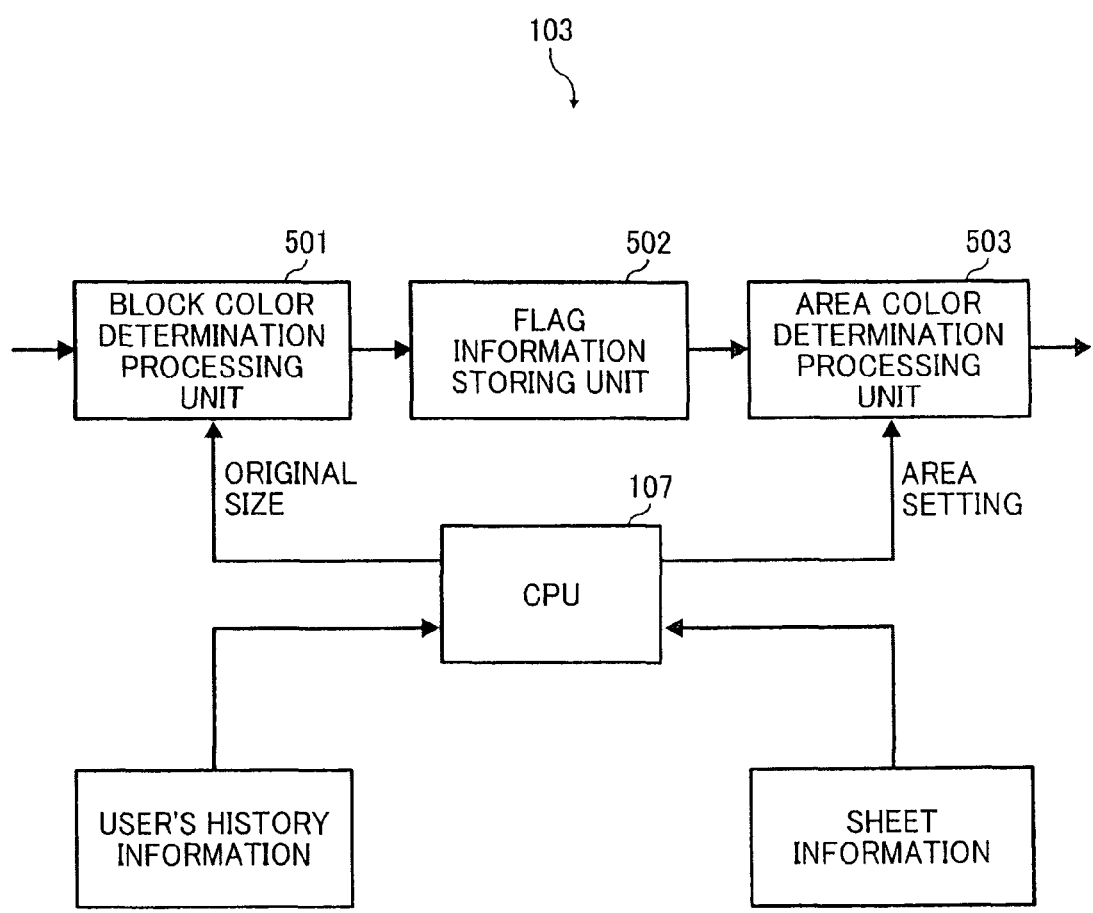
FIG. 5 is a block diagram showing an example of the internal configuration of a color determination unit.

Next, the color determination unit 103 will be described. FIG. 5 is a block diagram showing an example of the internal configuration of the color determination unit 103. In the shown example, the color determination unit 103 includes a block color determination processing unit 501, a flag information storing unit 502, and an area color determination processing unit 503.

Figure 7:
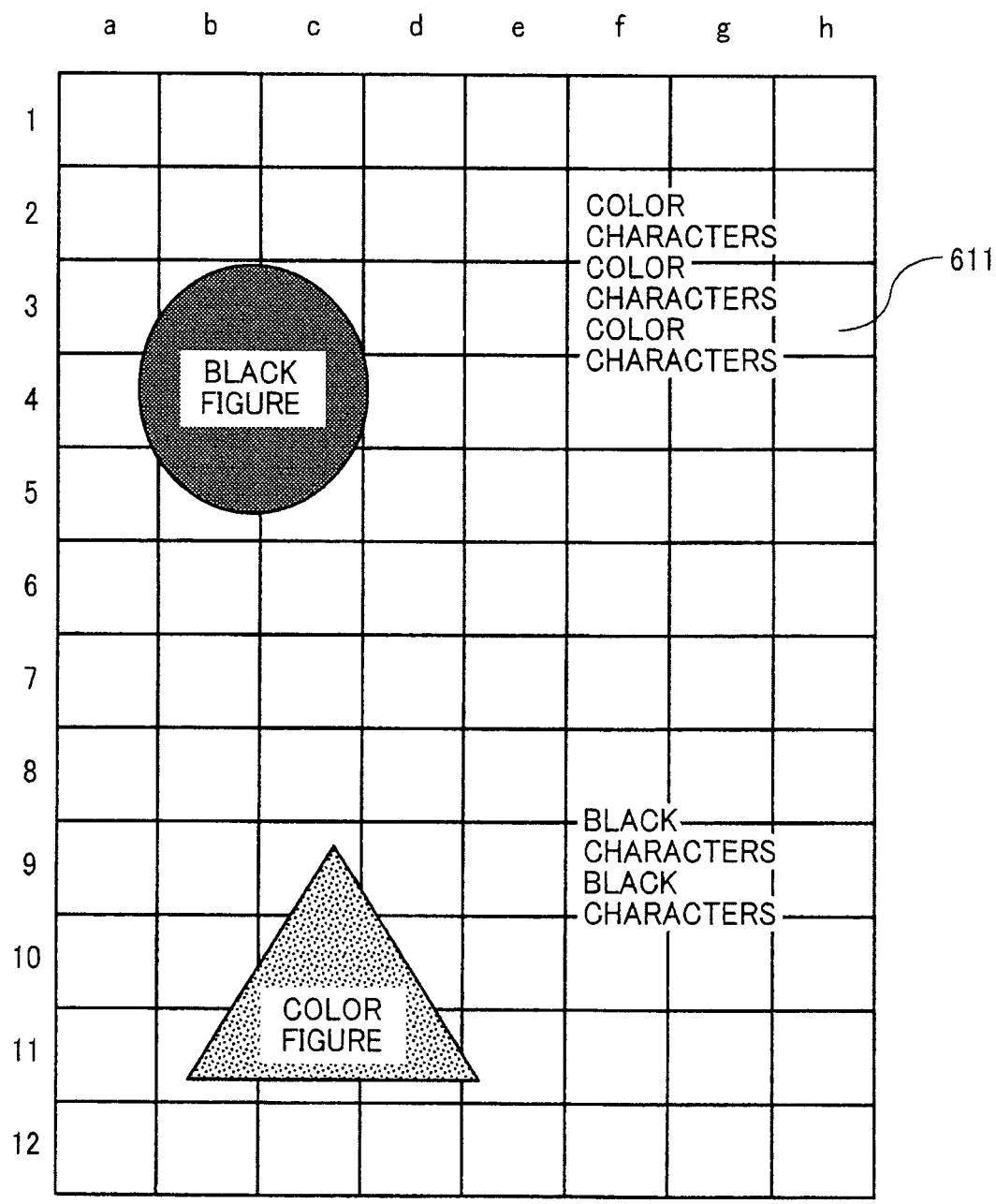
FIG. 7 is an explanatory diagram showing block division of the original image.

The color image data on the original is input from the image scanning unit 101 to the block color determination processing unit 501. The size of the original scanned by the image scanning unit 101 is notified to the block color determination processing unit 501 through the CPU 107. The block color determination processing unit 501 divides the original image into a large number of relatively small blocks. For example, suppose that an original 601 that includes color characters 602, black characters 603, a black figure 604, and a color figure 605 is scanned to input the image data. Such an original image is divided, for example, into a large number of blocks 611 as shown in FIG. 7. For convenience's sake, the blocks 611 will be denoted by column symbols (a to h) and row numbers (1 to 12). For example, the block 611 that lies in column e and row 2 will be referred to as block [e2]. It should be noted that while the blocks here are divided in a grid-like configuration, the dividing method is not limited thereto.

Figure 6:
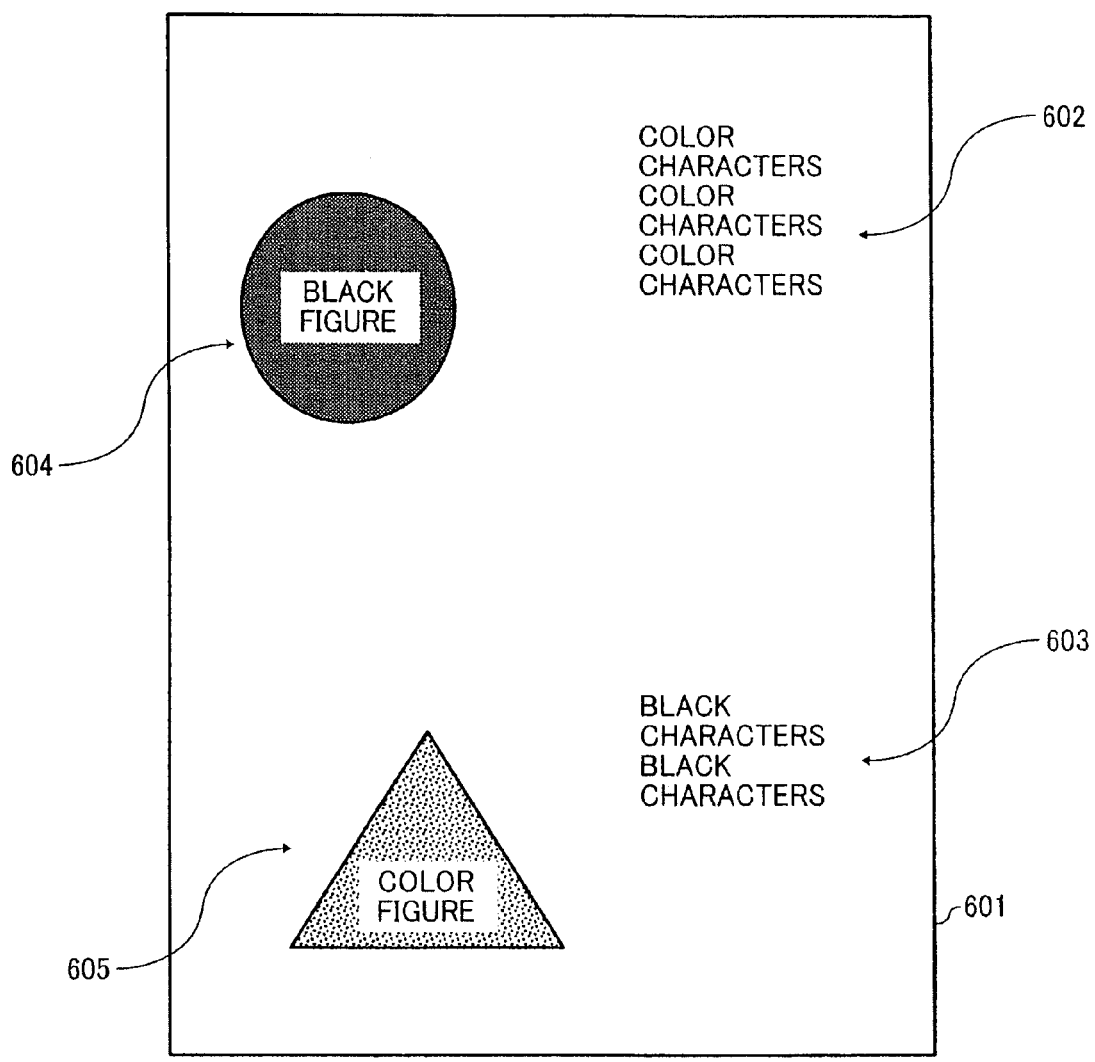
FIG. 6 is a diagram schematically showing an example of the original.

The block color determination processing unit 501 makes a color determination whether each individual block is a color image area or a monochrome image area, and writes the result of determination into the flag information storing unit 502 as 1-bit flag information in a one-on-one correspondence with the blocks. When an original such as shown in FIG. 6 is main-scanned from left to right and sub-scanned from top to bottom, the image data on the scanning line corresponding to the first row of blocks is initially input in succession. In each of the blocks in the first row, the block color determination processing unit 501 counts the number of pixels that are determined to be ones of a color image area. If the count value reaches or exceeds a predetermined value, the block is determined to be a color image area. If the count valued does not reach the predetermined value, the block is determined to be a monochrome image area.

The counter for counting the number of pixels is prepared as a counter area on a RAM, for example. The number of counters may be the same as the number of blocks per row (in the example of FIG. 7, eight), i.e., irrelevant to the number of set areas.

Whether or not a pixel is of a color image area may be determined by conventionally known methods. For example, a pixel whose color-indicating component value such as color saturation and color difference is higher than a predetermined threshold may be simply determined to be one of a color image area. Such pixels may be checked for continuity, and determined to be ones of a color image area if continuity is observed. The foregoing are just a few examples. The method of determination is not limited in particular as long as it is possible to determine pixels of a color image area.

Subsequently, the image data on the scanning line corresponding to the second row of blocks is input in succession, and color determination is made on each of the blocks in the second row. It should be appreciated that the counters used for the color determination on the first row are reset before reuse. Color determination is similarly performed up to the final row of blocks. In FIG. 7, the blocks [a1], [b1], and the like are determined to be of a monochrome image area. The blocks [e2], [f2], and the like are determined to be of a color image area.

The CPU 107 sets a plurality of areas for use in the area color determination processing unit 503. Each of the set areas can be designated as the output area of the original at the time of the output processing on the image data. The area color determination processing unit 503 refers to the flag information or the result of color determination on each block stored in the flag information storing unit 502, and determines whether the original is in color or monochrome in each of the set areas. For example, if a set area includes at least one block that is determined to be a color image area, the original is determined to be in color in that area. If a set area includes no block that is determined to be a color image area, the original is determined to be monochrome in that area. Another determination rule that may be employed is such that the original is determined to be in color in areas where the number of blocks determined to be a color image area is greater than or equal to a predetermined number no smaller than two. In the other areas, the original is determined to be monochrome.

Figure 8:
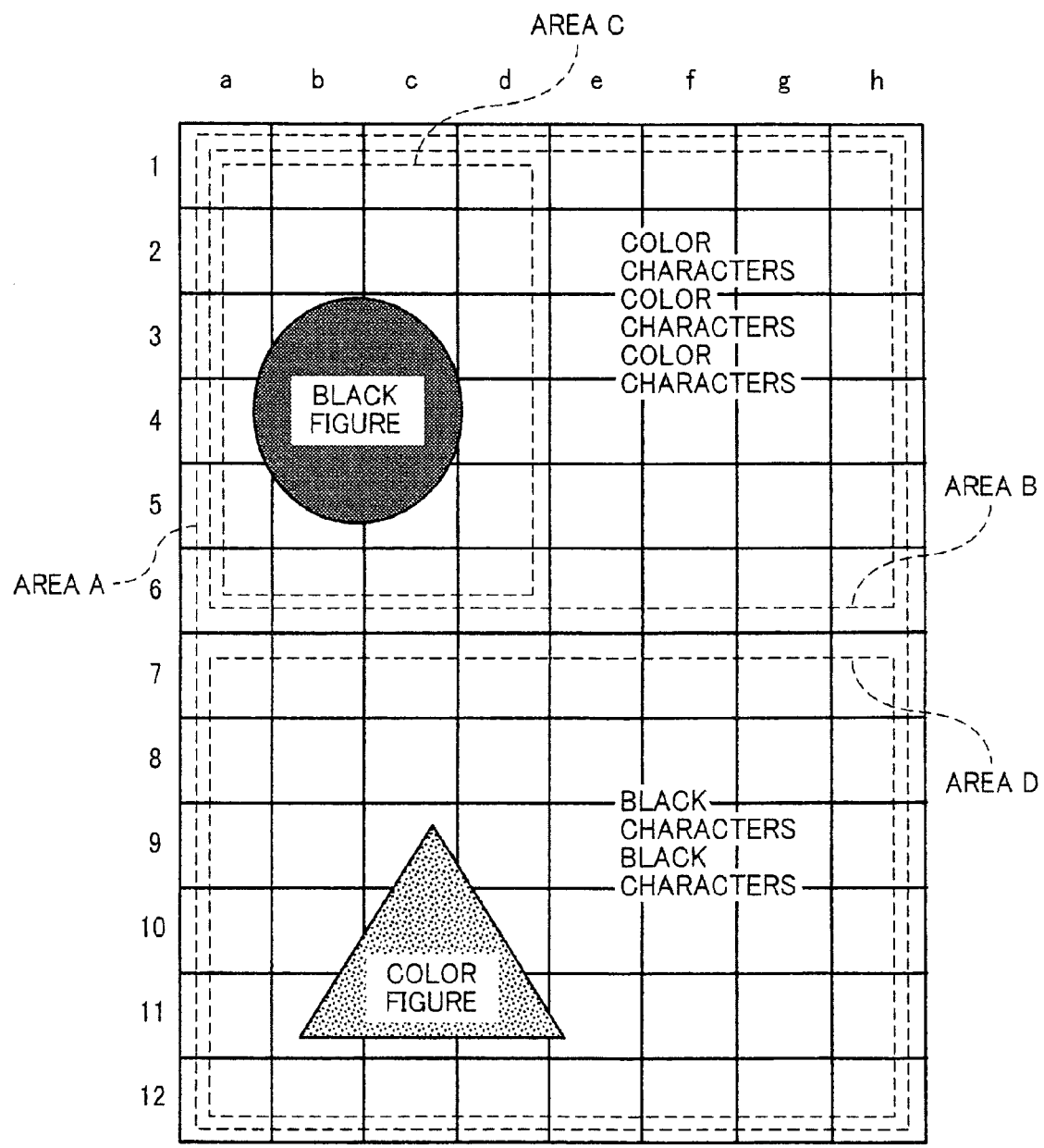
FIG. 8 is a diagram showing set areas overlapped on what is shown in FIG. 7.

For example, suppose there are set areas A, B, C, and D such as shown in FIG. 8. The areas A, B, and D are determined to be in color since the areas include blocks that are determined to be a color image area. The area C includes no block that is determined to a color image area, and is thus determined to be monochrome. Such area color determination processing can be performed, for example, by the following procedure.

A description will be given in conjunction with the example of FIG. 8. The flag information, the result of color determination on each block, is referred to in succession from the block [a1] to the block [h1]. In this example, no block is found that is determined to be a color image area. Referring to the flag information on the next row of blocks, the block [e2] is one that is determined to be a color image area. Consequently, the original is determined to be in color in the areas A and B that include the block, and the determination processing on the areas is ended (the rule employed here is such that areas that include at least one block determined to be a color image area are determined to be in color). Since the areas C and D still remain undetermined, the same determination processing procedure is continued. By the sixth row, none of the blocks included in the area C is determined to be a color image area. For the area C, the original is determined to be monochrome, and the processing thereon is ended. The processing procedure continues since the area D still remains undetermined. The block [f8] in the eighth row is determined to be a color image area. The original is therefore determined to be in color in the area D, and the processing is ended. At this stage, the area color determination processing is completed.

As has been described above, the original is divided into blocks, and each of the blocks is subjected to a determination whether it is a color image area or a monochrome image area. On the basis of the result of determination, a color determination is made on each set area. As seen in the example of FIG. 8, various areas intricately overlapping each other can thus be set easily, and it is possible to make a determination whether the original is in color or monochrome area by area with a simple processing procedure. If the determination rule employed is such that an area that includes at least one block determined to be a color image area is determined to be a color document, there is no need to prepare area-specific counters for the area color determination processing.

As the result of determination, the area color determination processing unit 503 outputs data that shows the areas and the distinction whether a color document or a monochrome document. The result of determination is stored, for example, as bibliographic information on the image data as mentioned above.

It should be noted that the result of color determination on each area and the flag information in the flag information storing unit 502 may be stored together. After the storing of the image data, the flag information stored may be transferred to the flag information storing unit 502 in the color determination unit 103, if needed, so that the area color determination processing unit 503 performs the color determination processing on an arbitrary set area. Such a mode is also covered by the present invention. Furthermore, when scanning the original, the color determination unit 103 may perform only the block-by-block color determination. processing in the block color determination processing unit 501. The resulting block-by-block flag information is stored as accessory information such as bibliographic information on the image data. The flag information subsequently is transferred to the flag information storing unit 502 of the color determination unit 103 when needed, so that the area color determination processing unit 503 performs the color determination processing on an area that is set arbitrarily. Such a mode is also covered by the present invention.

Now, the method of setting areas to the area color determination processing unit 503 will be described. The CPU 107 initially sets an area corresponding to the size of the original that is loaded and scanned on the platen of the image scanning unit 101. The reason is that MFP users often want to simply copy the original as scanned.

Figure 9:
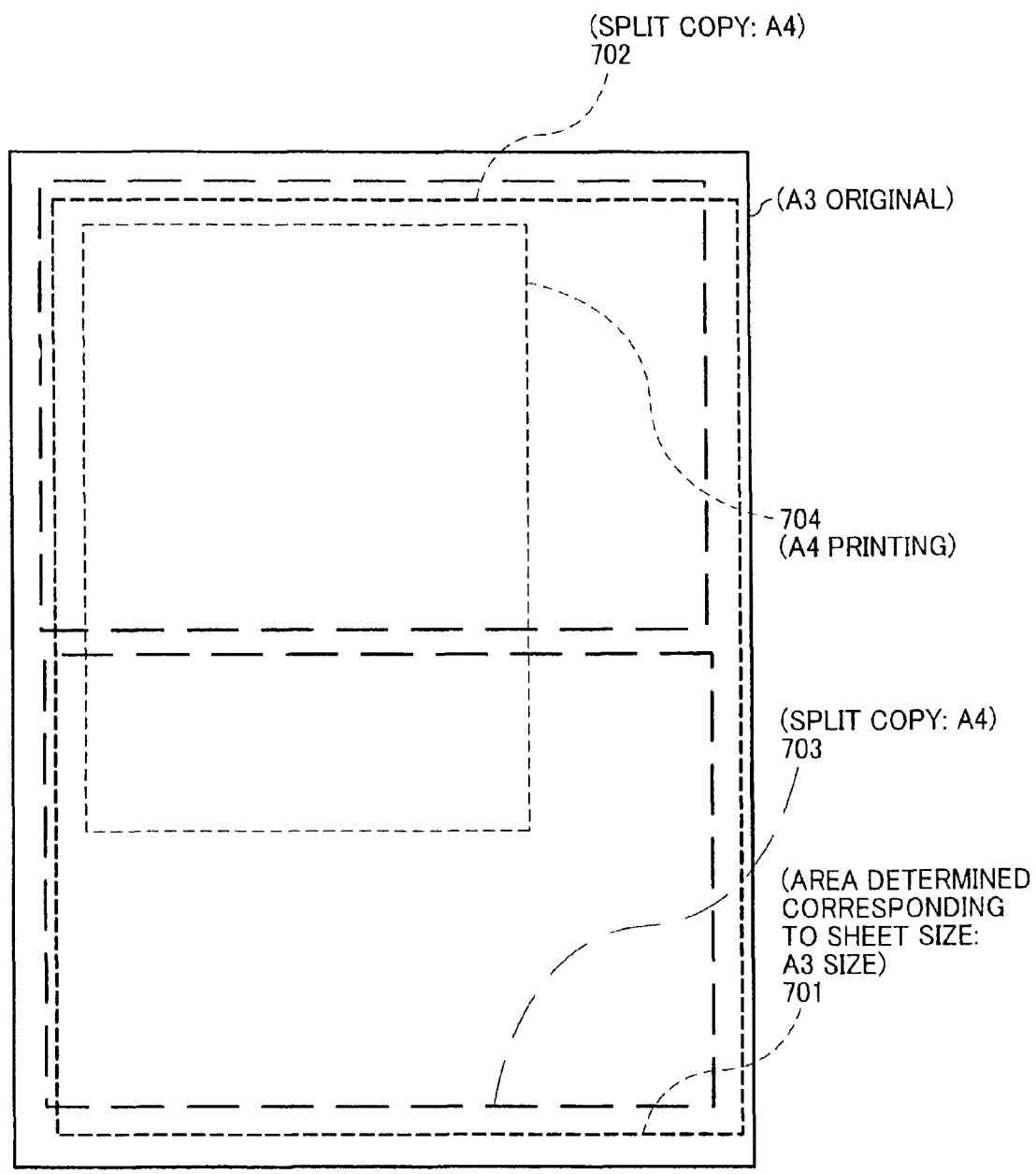
FIG. 9 is a block diagram showing another example of the area setting.

MFP often keeps track of history information related to users' image output, such as the use of output areas in particular. When such history information is kept track of, the CPU 107 searches the user's history information by using a user ID that is entered from the operating unit 113 for user authentication, and sets the output areas frequently used by the user to the area color determination processing unit 503. For example, suppose that the scanned original is A3 size. As shown in FIG. 9, the CPU 107 initially sets an A3-size area 701. Suppose also that the history information shows that the user often splits an A3-size original image into two A4 images for printing as well as A4 same-magnification printing. As shown in FIG. 9, the CPU 107 then sets areas 702 and 703 corresponding to A4 split printing and an area 704 corresponding to A4 same-magnification printing. It will be understood that such a mode of setting areas according to the user's usage on the basis of the history information is covered by the present invention.

MFP is typically configured so that sheets for frequent output are loaded in paper feed trays, and the CPU 107 can access the information on the sizes and orientations (aspect) of the loaded sheets. Suppose, for example, there are four paper feed trays, and A4 landscape, A4 portrait, and A3 sheets are loaded therein. For an original of A3 size, an A3-size area is set along with areas corresponding to A4 landscape and A4 portrait. It will be understood that such a mode of setting areas corresponding to the sizes and orientations of the output sheets loaded in the apparatus is covered by the present invention.

By the foregoing area setting, the probability is high that the result of color determination on an area that matches with the output area the user desires when outputting stored image data will have been obtained. This leads to improved reusability of the stored images.

Now, according to the processing method of the block color determination processing unit 501 in the embodiment of the color determination unit 103 which has been described with reference to FIG. 5, blocks such as [e2] of FIG. 7 overlap only slightly with the color characters, a color image area. The numbers of pixels that are counted as pixels of a color image area are small, and the count values may fail to reach the determination threshold so that the blocks can be misidentified as a monochrome image area.

In the example of FIG. 7, the block [e2] lies adjacent to blocks that overlap much with the color image area. Since those adjacent blocks are properly determined to be a color image area, the misidentification of the block [e2] will not hinder the color determination of the area color determination processing unit 503 on the area B (FIG. 8) and the like. If color images lie only in borders between adjoining blocks, however, all the blocks may possibly be misidentified as a monochrome image area. If so, the area that includes the blocks can be misidentified as a monochrome image area despite the inclusion of the color images.

Hereinafter, another example of the color determination unit 103 will be described. In the example, the block color determination processing unit 501 can prevent the foregoing block misidentification and allow area color determination processing of higher reliability.

Figure 10:
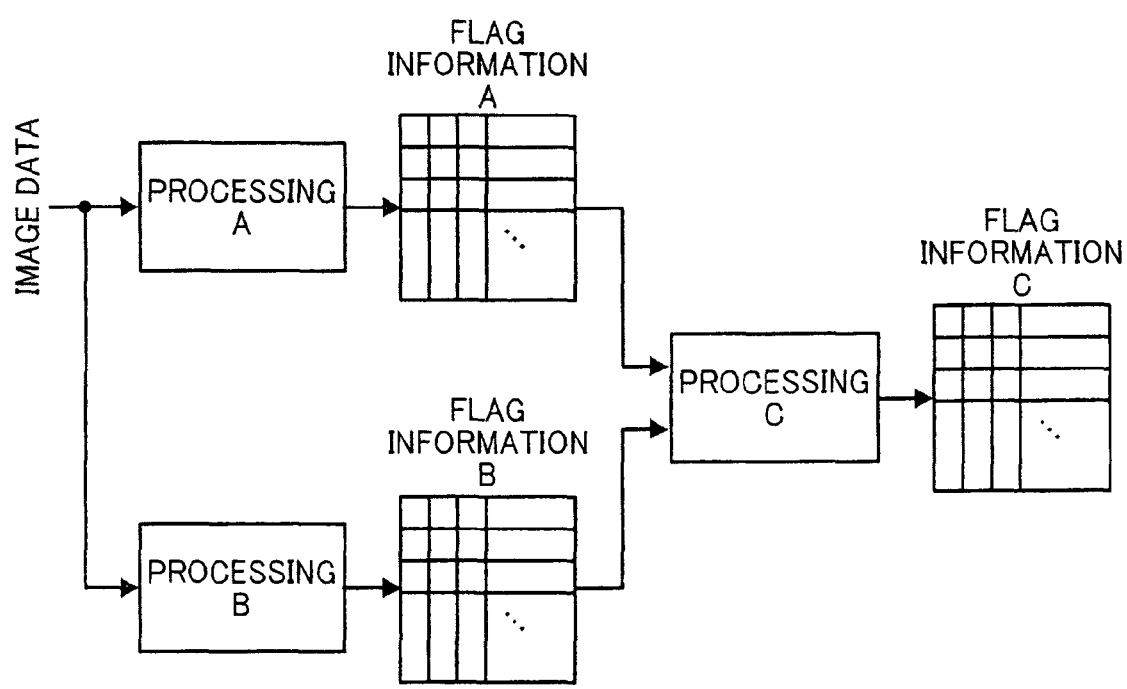
FIG. 10 is an explanatory diagram showing block color determination processing that involves two types of block division in relatively shifted positions.

FIG. 10 is an explanatory diagram of the processing procedure of the block color determination processing unit 501 according to the example. The block color determination processing unit 501 performs processing A and processing B in parallel.

Figure 11:
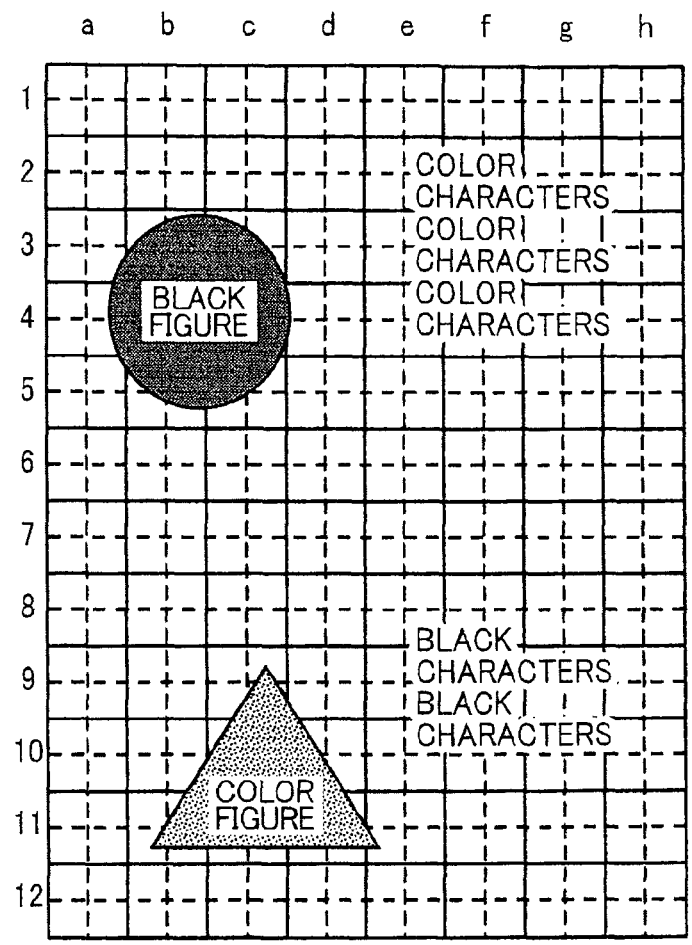
FIG. 11 is a diagram showing first blocks and second blocks in solid lines and broken lines, respectively, overlapped on what is shown in FIG. 7.

In the processing A, the block color determination processing unit 501 divides the image into blocks as shown in solid lines in FIG. 11, and counts pixels that are determined to be ones of a color image area block by block. A block in which the count value is greater than or equal to a predetermined threshold th1 is determined to be a color image area. If the count value is smaller than a predetermined threshold th2 (<th1), the block is determined to be a monochrome image area. If the count value is greater than or equal to the threshold th2 and smaller than the threshold th1, the block is determined to be an ambiguous image area. The block color determination processing unit 501 then generates block-by-block flag information A that indicates the result of determination in two bits.

The processing B is the same as the processing A in counting pixels that are determined to be ones of a color image area block by block. In the processing B, however, the blocks are divided at positions different from in the processing A. Referring to FIG. 11, the processing A divides blocks at positions shown in solid lines. The processing B divides blocks at positions horizontally and vertically shifted by half a pitch as shown in broken lines. It should be noted that shifting the block dividing positions by half a pitch is just an example. In the processing B, the block color determination processing unit 501 counts pixels that are determined to be ones of a color image area block by block. If the count value is greater than or equal to a predetermined threshold th, the block is determined to be a color image area. If the count value is smaller than the threshold th, the block is determined to be a monochrome image area. The block color determination processing unit 501 generates block-by-block flag information B that indicates the result of determination in one bit.

The block color determination processing unit 501 performs processing C in parallel with the processing A and B, or after the completion of the processing A and B. In the processing C, the block color determination processing unit 501 corrects the result of determination on each block that is indicated to be an ambiguous image area by the flag information A to either a color image area or a monochrome image area with reference to the flag information B.

More specifically, concerning a block of the processing A that is indicated to be an ambiguous image area by the flag information A, the block color determination processing unit 501 refers to the flag information B on blocks of the processing B that lie in positions overlapping with the block concerned (referred to as overlapping blocks). If the result of determination on at least one of the overlapping blocks is a color image area, the block color determination processing unit 501 corrects the result of determination on the block concerned to a color image area. If the results of determination on all the overlapping blocks are a monochrome image area, the block color determination processing unit 501 corrects the result of determination on the block concerned to a monochrome image area.

Figure 12:
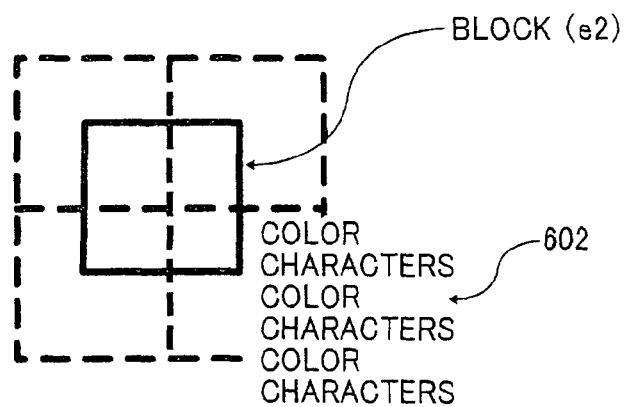
FIG. 12 is an enlarged diagram showing a first block and second blocks overlapped thereon.

FIG. 12 is an enlarged diagram showing the block [e2] of the processing A. and the blocks of the processing B lying in overlapping positions. Suppose that the block [e2] is determined to be an ambiguous image area by the processing A since it overlaps only slightly with a color character. Among the four blocks (in broken lines) of the processing B that overlap the block [e2], the lower right block is determined to be a color image area since the color characters occupy a large area. The result of determination on the block [e2] which is determined to be an ambiguous image area by the processing A is thus corrected to a color image area by the processing C.

The processing C corrects the results of determination of the processing A on the blocks in the foregoing manner, and generates flag information C that indicates the results of determination after the processing in one bit each, in a one-on-one correspondence with the blocks of the processing A (the blocks shown in solid lines in FIG. 11). The flag information C is input to the area color determination processing unit 503 as the result of the block color determination processing. The flag information storing unit 502 is used as the storing area of the flag information A, B, and C.

The processing of the area color determination processing unit 503 is the same as in the foregoing example, and a description thereof will thus not be repeated.

Now, the data transfer from the image scanning unit 101 to the scanned image processing unit 102, the output image processing unit 104, and the image writing unit 106 is carried out through the extension bus 100. A wait can sometimes occur during the transfer, for example, when outputting the image data processed by the output image processing unit 104 to the image writing unit 106 because paper output is not ready due to the status of the engine plotter. Another example is when inputting the image data to the output image processing unit 104 because the output image processing unit 104 is processing another piece of image data. In such cases, the image data is once retained in a storing device (the memory 108 or the HDD 109). The extension bus 100 is shared between the plurality of modules, and the CPU 107 adjusts the input and output of each module.

In the configuration shown in FIG. 1, the document scanning operation of the image scanning unit 101 and the output operation of the image writing unit 106 may be performed independent of each other. For example, the operation of scanning an original and storing the image data into the HDD 109 may be performed simultaneously and in parallel with the operation of the image writing unit 106 making a paper output of image data stored in the HDD 109 intactly or after the processing of the output image processing unit 104.

Now, a description will be given of the case where the scanned image data on an original is stored into the HDD 109 in a device-independent form and the stored image data is reused afterward.

Initially, the following provides the processing procedure up to the conversion of the image data scanned by the image scanning unit 101 into a device-independent form for storage. An original is scanned by the image scanning unit 101 and input as image data. The image data is converted into image data of device-independent form by the scanned image processing unit 102. Examples of the characteristics of the device-independent image data include color spaces such as the standard color space sYCC, the Adobe RGB space, and predetermined RGB spaces. Definitions on spatial frequencies and the like are also included. The image data converted into such characteristics by the scanned image processing unit 102 is stored into the HDD 109 through the extension bus 100. The color determination unit 103 performs color determination, and the result of determination is stored into the HDD 109 as bibliographic information along with the image data. Since the color determination is always performed and the result is stored with the image data, the user can select the output of the stored image data according to the result of color determination if needed.

The following provides the processing procedure up to the paper output of the stored image data. The image data stored in the HDD 109 is transferred to the output image processing unit 104 through the memory 108 and the extension bus 100. Since a paper output is intended, the output image processing unit 104 converts the image data of device-independent form into image data that is tailored to the output characteristics of the image writing unit 106. The converted image data is transferred to the image writing unit 106 through the memory 108, and a paper output is made.

Up to this point, the preferred embodiment of the image processing apparatus according to the present invention has been described. The image processing apparatus according to the present invention is an apparatus for storing an image of an original and outputting an entire area or partial area of the stored image of the original as a color image or a monochrome image. The apparatus includes: an area setting unit that sets a plurality of areas; a color determination unit that determines whether the original is in color or monochrome in each of the areas set by the area setting unit on the basis of the image of the original; and a unit that stores a result of determination made by the color determination unit on the image of the original as accessory information on the image of the original. In the foregoing embodiment, the area setting unit corresponds to the CPU 107. The color determination unit corresponds to the color determination unit 103. The unit for storing the result of determination made by the color determination unit as accessory information on the image of the original corresponds to the memory 108 and the HDD 109. A computer may be operated as such units. A program for that purpose, and a semiconductor memory device and other computer-readable recording (storing) media containing the program are also covered by the present invention.

The description of the foregoing embodiment has also dealt with an embodiment of the image processing method according to the present invention. More specifically, the image processing method according to the present invention is a method for storing an image of an original and outputting an entire area or partial area of the stored image of the original as a color image or a monochrome image. The method includes: an area setting step of setting a plurality of areas; a color determination step of determining whether the original is in color or monochrome in each of the areas set by the area setting step on the basis of the image of the original; and a step of storing a result of determination made by the color determination step on the image of the original as accessory information on the image of the original. In the foregoing embodiment, the area setting step corresponds to the area setting operation of the CPU 107. The color determination step corresponds to the color determination operation of the color determination unit 103. The step of storing the result of determination made by the color determination step as accessory information on the image of the original corresponds to the operation of storing the result of determination into the memory 108 and the HDD 109 as bibliographic data on the original image data. Such steps may be performed by a computer. A program for that purpose, and a semiconductor memory device and various other types of computer-readable recording (storing) media containing the program are also covered by the present invention.

According to one aspect of an embodiment of the present invention, in the image processing apparatus or method for storing an image of an original and outputting an entire area or partial area of the stored image as a color image or a monochrome image, the reusability of the stored image can be improved by making a determination whether the original is in color or monochrome beforehand in various areas including ones that are expected to be output areas of the image. According to one aspect of an embodiment of the present invention, the image of the original is divided into a plurality of first blocks, and whether or not each of the first blocks is a color image area is determined. Whether the original is in color or monochrome is determined in each of the set areas on the basis of the result of determination on the first blocks included in that area. This allows color determination even on intricately overlapping areas. Consequently, the reusability of the stored image can be improved by setting various areas including intricately overlapping ones and performing color determination on each of the areas in advance. The area-by-area color determination can be made with a small, almost constant amount of processing even if the areas are intricately set or the set areas are large in number. Since the area-by-area color determination can be made without the provision of counters for respective areas, the memory for constituting counters and the like for use in the determination processing will not increase with the number of set areas. According to another aspect of an embodiment of the present invention, a determination is made as to whether each of the first blocks into which the image of the original is divided is a color image area, a monochrome image area, or an ambiguous image area. The image of the original is divided into a plurality of second blocks that lie in shifted positions relative to the first blocks, and whether each of the second blocks is a color image area or a monochrome image area is determined. If a first block is determined to be an ambiguous image area, the result of determination thereon is corrected to either a color image area or a monochrome image area on the basis of the results of determination on the second blocks that overlap the first block. This can improve the accuracy of the color determination on the first blocks, and improves the accuracy of the area-by-area color determination which utilizes the results of color determination on the first blocks. Furthermore, the areas to set are determined on the basis of the history information pertaining to the user's image output and the information on the output sheets loaded in the apparatus. This allows effects such as improved reusability of the stored image since the probability is high that the result of color determination on an area that matches with the output area the user desires at the time of outputting the stored image has been obtained in advance.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus for storing an image of an original and outputting an entire area or partial area of the stored image of the original as a color image or a monochrome image, the apparatus comprising:
   an area setting unit for setting a plurality of areas;
   a color determination unit for determining whether the original is in color or monochrome in each of the areas set by the area setting unit on the basis of the image of the original; and
   a unit for storing a result of determination made by the color determination unit on the image of the original as accessory information on the image of the original, wherein
   the color determination unit includes a block color determination processing unit for dividing the image of the original into a plurality of first blocks and determining whether or not each of the first blocks is a color image area, and an area color determination processing unit for determining whether the original is in color or monochrome in each of the areas set by the area setting unit on the basis of a result of determination made by the block color determination processing unit on the first blocks included in the area, wherein
   the block color determination processing unit determines whether each of the first blocks into which the image of the original is divided is a color image area, a monochrome image area, or an ambiguous image area;
   divides the image of the original into a plurality of second blocks that lie in shifted positions relative to the first blocks, and determines whether each of the second blocks is a color image area or a monochrome image area; and
   corrects the result of determination on a first block that is determined to be an ambiguous image area to either a color image area or a monochrome image area on the basis of the result of determination on second blocks that overlap the first block.

2. The information processing apparatus according to claim 1, wherein the block color determination processing unit corrects the result of determination on the first block that is determined to be an ambiguous image area to a color image area if any one of the second blocks overlapping the first block is determined to be a color image area, and corrects the result of determination on the first block to a monochrome image area if all the second blocks overlapping the first block are determined to be a monochrome image area.

3. The information processing apparatus according to claim 1, wherein the area color determination processing unit determines that the original is in color in an area if the area includes a first block that is determined to be a color image area by the block color determination processing unit, and that the original is monochrome in an area if the area includes no first block that is determined to be a color image area by the block color determination processing unit.

4. The image processing apparatus according to claim 1, wherein the area setting unit determines an area to set on the basis of history information pertaining to user's image output.

5. The image processing apparatus according to claim 1, wherein the area setting unit determines an area to set on the basis of information pertaining to an output sheet loaded.

6. An image processing method for storing an image of an original and outputting an entire area or partial area of the stored image of the original as a color image or a monochrome image, the method comprising:
   setting a plurality of areas;
   determining whether the original is in color or monochrome in each of the areas set in the setting on the basis of the image of the original; and
   storing a result of determination made in the determining on the image of the original as accessory information on the image of the original, wherein
   the determining including dividing the image of the original into a plurality of first blocks and determining whether or not each of the first blocks is a color image area, and determining whether the original is in color or monochrome in each of the areas set in the setting on the basis of a result of the determination made on the first blocks included in the area,
   wherein in determining whether each of the first blocks is a color image area,
      it is determined whether each of the first blocks into which the image of the original is divided is a color image area, a monochrome image area, or an ambiguous image area;
      the image of the original is divided into a plurality of second blocks that lie in shifted positions relative to the first blocks, and it is determined whether each of the second blocks is a color image area or a monochrome image area; and
      the result of determination on a first block that is determined to be an ambiguous image area is corrected to either a color image area or a monochrome image area on the basis of the result of determination on second blocks that overlap the first block.

7. The information processing method according to claim 6, wherein in determining whether each of the first blocks is a color image area,
   the result of determination on the first block that is determined to be an ambiguous image area is corrected to a color image area if any one of the second blocks overlapping the first block is determined to be a color image area, and the result of determination on the first block that is determined to be an ambiguous image area is corrected to a monochrome image area if all the second blocks overlapping the first block are determined to be a monochrome image area.

8. The information processing method according to claim 6, wherein in determining whether the original is in color or monochrome in each of the areas set in the setting,
   it is determined that the original is in color in an area if the area includes a first block that is determined to be a color image area, and that the original is monochrome in an area if the area includes no first block that is determined to be a color image area.

9. The image processing method according to claim 6, wherein in setting a plurality of areas, an area to set is determined on the basis of history information pertaining to user's image output.

10. The image processing method according to claim 6, wherein in setting a plurality of areas, an area to set is determined on the basis of information pertaining to an output sheet loaded.

11. A computer program product comprising a non-transitory computer-usable medium having computer-readable program codes embodied in the medium for storing an image of an original and outputting an entire area or partial area of the stored image of the original as a color image or a monochrome image in an image processing apparatus, the program codes when executed causing a computer to execute:
   setting a plurality of areas;
   determining whether the original is in color or monochrome in each of the areas set in the setting on the basis of the image of the original; and
   storing a result of determination made in the determining on the image of the original as accessory information on the image of the original, wherein
   the determining includes dividing the image of the original into a plurality of first blocks and determining whether or not each of the first blocks is a color image area, and determining whether the original is in color or monochrome in each of the areas set in the setting on the basis of a result of determination made on the first blocks included in the area,
   wherein in determining whether each of the first blocks is a color image area,
      it is determined whether each of the first blocks into which the image of the original is divided is a color image area, a monochrome image area, or an ambiguous image area,
      the image of the original is divided into a plurality of second blocks that lie in shifted positions relative to the first blocks, and it is determined whether each of the second blocks is a color image area or a monochrome image area; and
      the result of determination on a first block that is determined to be an ambiguous image area is corrected to either a color image area or a monochrome image area on the basis of the result of determination on second blocks that overlap the first block.

* * * * *